United States Patent

[19]

Smith et al.

[11] Patent Number: 6,127,011

[45] Date of Patent: Oct. 3, 2000

[54] FLEXIBLE TUBE AND METHOD OF MAKING

[75] Inventors: Roger P. Smith, Exeter, N.H.; Thomas J. Krall, Toledo, Ohio; Jeffery S. Lugar, Fremont, Ohio; Michael D. Norton, Walbridge, Ohio

[73] Assignee: Owens-Brockway Plastics Products Inc., Toleod, Ohio

[21] Appl. No.: 09/089,656

[22] Filed: Jun. 3, 1998

Related U.S. Application Data

[60] Division of application No. 08/735,580, Oct. 23, 1996, Pat. No. 5,800,700, which is a continuation-in-part of application No. 08/228,048, Apr. 15, 1994, Pat. No. 5,632,951, which is a continuation-in-part of application No. 08/493,837, Jun. 22, 1995, Pat. No. 5,687,878.

[51] Int. Cl.$^7$ ............................ B65D 35/08; B29D 22/00
[52] U.S. Cl. .................. 428/35.7; 428/36.9; 428/36.92; 206/277; 222/92; 222/107; 215/2; 215/371; 220/608
[58] Field of Search ................................ 428/35.7, 36.9, 428/36.91, 36.92; 206/277; 222/92, 107, 215, 206; 264/509, 524, 539; 215/370, 371, 2; 220/608, 623

[56] References Cited

U.S. PATENT DOCUMENTS

| | | | |
|---|---|---|---|
| 1,116,523 | 11/1914 | Westlake .................................. | 215/44 |
| 1,172,447 | 2/1916 | Forte ..................................... | 53/331.5 |
| 1,227,297 | 5/1917 | Neidlinger ............................. | 264/132 |
| 1,547,759 | 7/1925 | Journeay ................................. | 285/85 |
| 2,491,406 | 12/1949 | Zeeb ....................................... | 285/120 |
| 2,562,523 | 7/1951 | Brunet . | |
| 2,710,987 | 6/1955 | Sherman . | |
| 2,724,329 | 11/1955 | Lucas ..................................... | 101/126 |
| 2,908,034 | 10/1959 | Hackett .................................. | 264/539 |
| 2,911,673 | 11/1959 | Soubier . | |
| 3,019,480 | 2/1962 | Cheney .................................. | 264/539 |
| 3,032,810 | 5/1962 | Soubier .................................. | 264/539 |
| 3,115,682 | 12/1963 | Soubier et al. ....................... | 425/131.1 |
| 3,144,493 | 8/1964 | Santelli ................................... | 264/51 |
| 3,191,814 | 6/1965 | Corsette et al. ....................... | 222/384 |
| 3,248,017 | 4/1966 | Allen ...................................... | 222/215 |
| 3,263,871 | 8/1966 | Thompson .......................... | 222/384 X |
| 3,288,334 | 11/1966 | Corsette ................................. | 222/107 |
| 3,358,062 | 12/1967 | Lemelson ................................ | 264/96 |
| 3,596,808 | 8/1971 | Corsette ................................. | 222/385 |
| 3,923,250 | 12/1975 | Boris .................................. | 222/385 X |
| 3,934,763 | 1/1976 | Steiman ................................. | 222/321 |
| 3,940,029 | 2/1976 | Horvath ................................. | 222/340 |
| 3,955,720 | 5/1976 | Malone .................................. | 222/396 |
| 4,098,932 | 7/1978 | Frische . | |

(List continued on next page.)

FOREIGN PATENT DOCUMENTS

| | | |
|---|---|---|
| 268539 | 5/1988 | European Pat. Off. . |
| 0334468 | 9/1989 | European Pat. Off. . |
| 2167559 | 3/1973 | France . |
| 2680721 | 3/1993 | France . |
| 55-118834 | 9/1980 | Japan . |
| 2-219752 | 9/1990 | Japan . |
| 3115341 | 5/1991 | Japan . |
| 6211256 | 3/1994 | Japan . |
| 2023088 | 12/1979 | United Kingdom . |
| 2237000 | 4/1991 | United Kingdom . |

OTHER PUBLICATIONS

Arthur N. Skeels, Jr., Guide to Plastic Bottle Decoration SPE Journal, vol. 27, May 1971.

*Primary Examiner*—Rena L. Dye

[57] ABSTRACT

In a method and apparatus wherein a container is formed, decorated by rotating the container and then the base of the contianer is cut off for a plastic tube, a container is formed with a diametral lug on the base to facilitate rotating the container during decorating. In another form, opposed diametral surfaces are provided on the lower end of the container adjacent the base. In another form, the diametral surfaces are arcuate. In another form, the lower end of the container includes a frustoconical surface. In another form, circumferentially spaced axial grooves are provided in the frustoconical surface.

11 Claims, 9 Drawing Sheets

U.S. PATENT DOCUMENTS

| | | | |
|---|---|---|---|
| 4,108,324 | 8/1978 | Krishnakumar | 220/608 |
| 4,118,452 | 10/1978 | Myers et al. | 264/529 |
| 4,154,374 | 5/1979 | Kirk, Jr. | 222/328 |
| 4,174,052 | 11/1979 | Capra et al. | 222/207 |
| 4,175,993 | 11/1979 | Robertson | 156/567 |
| 4,188,179 | 2/1980 | Linss et al. | 264/529 |
| 4,193,551 | 3/1980 | Saito et al. | 239/333 |
| 4,216,883 | 8/1980 | Tasaki et al. | 222/325 |
| 4,265,948 | 5/1981 | Hayes et al. | 206/277 |
| 4,305,902 | 12/1981 | Uhlig | 244/211.12 |
| 4,344,744 | 8/1982 | Schuster et al. | 417/550 |
| 4,345,691 | 8/1982 | Burke | 215/216 |
| 4,434,916 | 3/1984 | Ruscitti et al. | 222/321 |
| 4,479,589 | 10/1984 | Ford | 222/153 |
| 4,510,115 | 4/1985 | Gokcen et al. | 264/515 |
| 4,529,469 | 7/1985 | Jorss | 156/360 |
| 4,591,076 | 5/1986 | Iizuka | 222/321 |
| 4,598,839 | 7/1986 | Dombroskie et al. | 222/92 |
| 4,636,166 | 1/1987 | Franks et al. | 264/509 |
| 4,685,594 | 8/1987 | Czech | 222/182 |
| 4,692,103 | 9/1987 | Anderson | 417/547 |
| 4,747,517 | 5/1988 | Hart | 222/137 |
| 4,790,117 | 12/1988 | Hansen | 53/410 |
| 4,806,091 | 2/1989 | Linss et al. | 425/529 |
| 4,806,092 | 2/1989 | Linss et al. | 425/529 |
| 4,806,093 | 2/1989 | Linss et al. | 425/529 |
| 4,808,105 | 2/1989 | Linss et al. | 425/529 |
| 4,854,484 | 8/1989 | Gentile et al. | 222/256 |
| 4,941,599 | 7/1990 | Reinertz et al. | 222/401 |
| 4,997,107 | 3/1991 | Snyder et al. | 222/107 |
| 5,004,123 | 4/1991 | Stoody | 222/94 |
| 5,011,046 | 4/1991 | Graf et al. | 222/321 |
| 5,047,271 | 9/1991 | Feddersen et al. | 428/36.92 |
| 5,064,102 | 11/1991 | Montaner | 222/147 |
| 5,083,683 | 1/1992 | Knickerbocker | 222/382 |
| 5,102,018 | 4/1992 | Desazars de Montgailhard | 222/321 |
| 5,105,985 | 4/1992 | Kreeber | 222/107 |
| 5,150,782 | 9/1992 | Richter | 198/394 |
| 5,156,303 | 10/1992 | Yamamoto et al. | 222/107 |
| 5,163,588 | 11/1992 | Cater | 222/321 |
| 5,167,349 | 12/1992 | Rodder et al. | 222/107 |
| 5,183,185 | 2/1993 | Hutcheson et al. | 222/206 |
| 5,183,188 | 2/1993 | Rebeyrolle et al. | 222/383 |
| 5,201,984 | 4/1993 | Bedin | 156/566 |
| 5,224,585 | 7/1993 | Naka et al. | 198/867.13 |
| 5,398,485 | 3/1995 | Osifchin | |
| 5,582,328 | 12/1996 | Brown | 222/107 |

FLEXIBLE TUBE AND METHOD OF MAKING

This application is a division of application Ser. No. 08/735,580 filed Oct. 23, 1996 U.S. Pat. No. 5,800,770, which is a continuation-in-part of application Ser. No. 08/228,048 filed Apr. 15, 1994, now U.S. Pat. No. 5,632,951, and Ser. No. 08/493,837 filed Jun. 22, 1995, now U.S. Pat. No. 5,687,878.

This invention relates to the manufacture of flexible tubes utilized for containing and dispensing viscous products such as personal care products and the like.

BACKGROUND AND SUMMARY OF THE INVENTION

In one method of manufacture of such flexible tubes, a fitment defining a threaded neck is attached to an open-ended tube and then the product is filled through the other end of the tube and the other end is closed.

In another method of making such flexible tubes, a hollow container having an integral neck is formed, as by blow molding, the base of the container is severed from the container, the container is placed on a mandrel whereupon decoration is applied to the open-ended container, a closure is applied to the finish and then the container is filled through the open end and the open end is sealed.

Among the objectives of the present invention are to provide a flexible tube having exceptional decoration or indicia; which incorporates a finish that requires no trimming; wherein the decoration can be applied by conventional silk screening equipment; wherein decorating such as silk screen and heat transfer can be done at high speeds; and wherein closures can be applied to the flexible tubes with a higher torque and at higher speeds.

In accordance with the invention, the method of forming a flexible plastic tube comprises injection molding a finish having an opening, extruding a tube integrally with the finish by relevant movement of the finish with respect to an extruder orifice, moving the finish axially away from the extruder orifice while continuing continuously extruding the tube, closing a blow mold about the extruded tube, blowing the tube into an integral container body having a closed bottom, opening the molds to provide an integral flexible tube with a finish thereon. Thereafter the method consists of decorating the body with indicia, and cutting the closed end of the tube leaving an open-ended tube of the end opposite the finish, and applying a closure to the finish. Preferably a closure is applied before cutting the bottom from the container. Preferably the closure is applied to the finish after decorating. Subsequently, the tube is filled through the open end and the open end is sealed. The step of decorating includes rotating the tube about the longitudinal axis of the tube while engaging the finish and bottom. The step of decorating preferably comprises rotating the container relative to a silk screen printing device. The step of injection molding and extrusion molding preferably comprises injecting and extruding linear low density polyethylene. However, high density polyethylene, low density polyethylene and polypropylene may be used.

In accordance with a further aspect of the invention, a container structure is provided that facilitates handling, rotating and decorating the container before cutting the closed end. The base of the container is provided with a single diametrical lug which is engaged by the complementary lug on the rotating chuck. In a further form of the container, the body of the container is strengthened by diametrically opposed surfaces which are arcuate in horizontal cross section and taper axially downwardly and inwardly toward the base of the container. In another form of the container the entire lower end of the container is tapered axially downwardly and inwardly to form a frusto-conical surface. In still further form of container, a plurality of cicumferentially spaced grooves our provided on the frusto-conical surface. In another form of container, the container is formed only with the frustoconical surface and grooves.

DESCRIPTION OF THE PREFERRED EMBODIMENT

Figure 1:
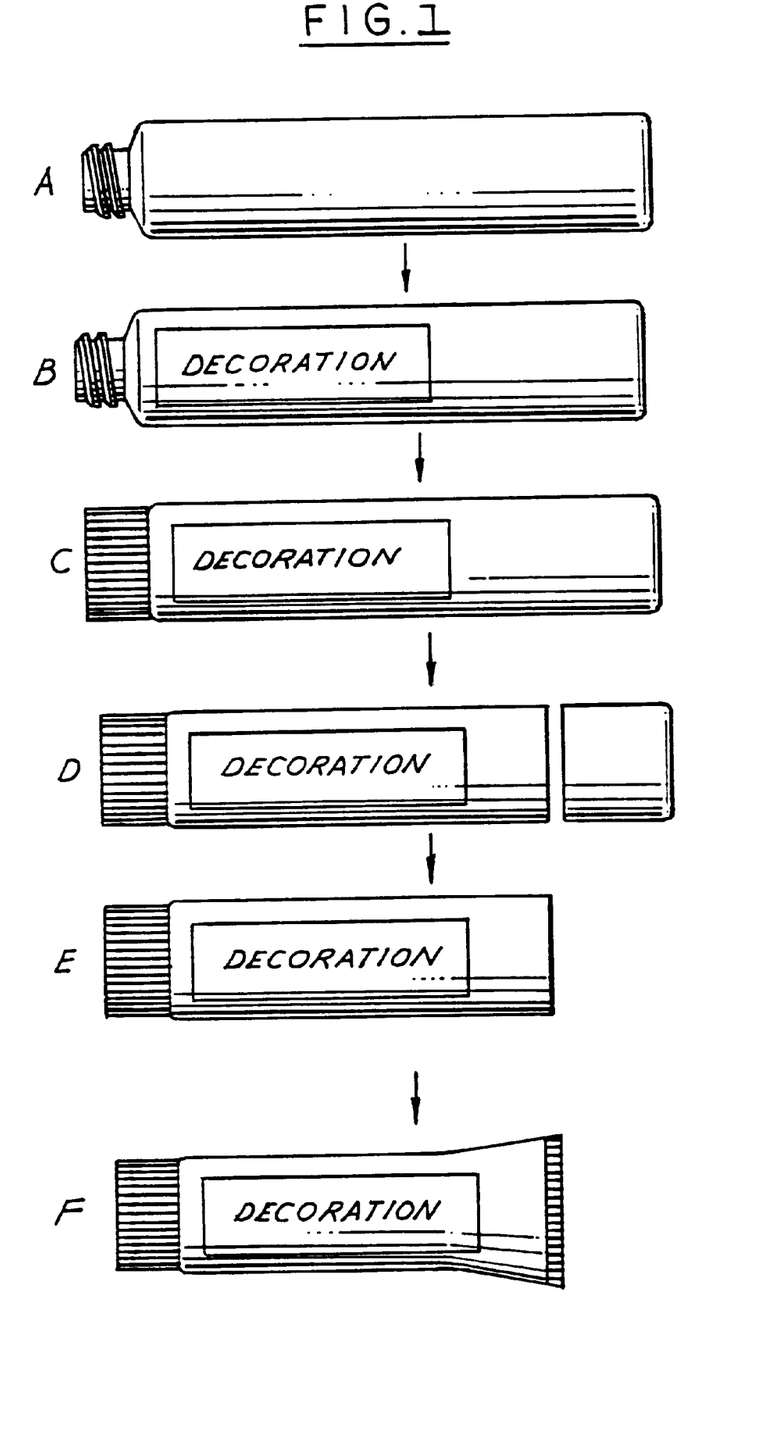
FIG. 1 is a diagram of the steps in making the flexible plastic tube embodying the invention.

Referring to FIG. 1 which is a schematic view of the succession of steps A–F to produce a filled container, the first step A comprises making a hollow plastic container by a method and apparatus wherein the neck or finish of the container is first injection molded, then a tube is extruded integrally with the injection molded finish, molds are closed about the tube and the tube is blown to form a container. Such a method and apparatus is shown in U.S. Pat. Nos. 2,710,987 and 2,911,673, incorporated herein by reference, and embodied in what has become known as a BC-3 machine.

As further shown in FIG. 1, the hollow blown container is then applied with indicia or decoration in one or more colors and designs through step B as may be desired. Step C of FIG. 1 shows applying a closure C to the container. The bottom of the container is then cut off as in step D leaving an open-ended tube as shown in step E. Step E shows the tube with the closure thereon as delivered to a customer. The purchaser of the open-ended tube fills the tube with the viscous product through the open end and then seals the open end as at F.

A closure can be applied either before or after decorating, herein shown as applied after the first decorating step B. Preferably, the closure is applied after decorating.

Figure 2:
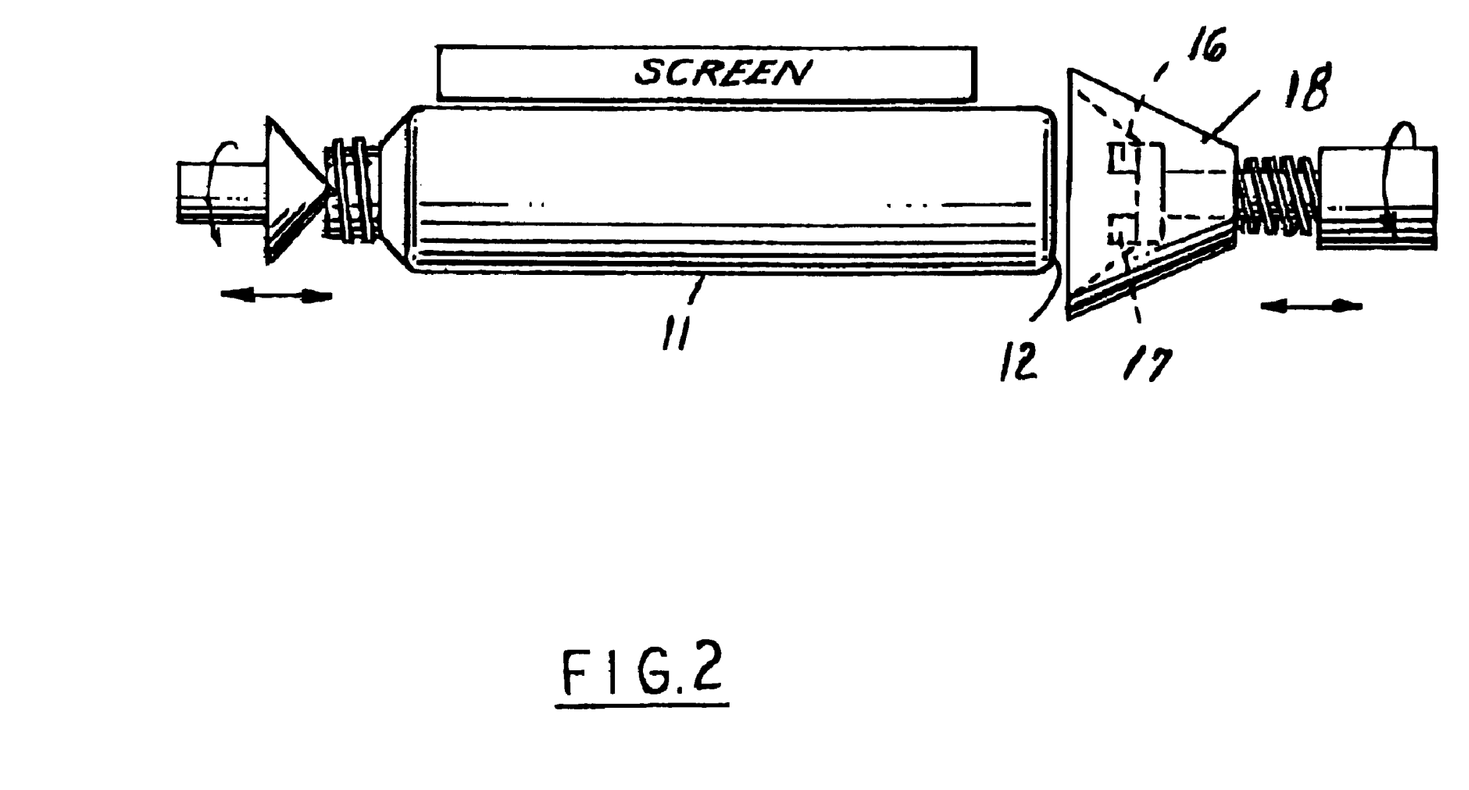
FIG. 2 is a diagram of an apparatus for silk screen decorating of the container.
Figure 3:
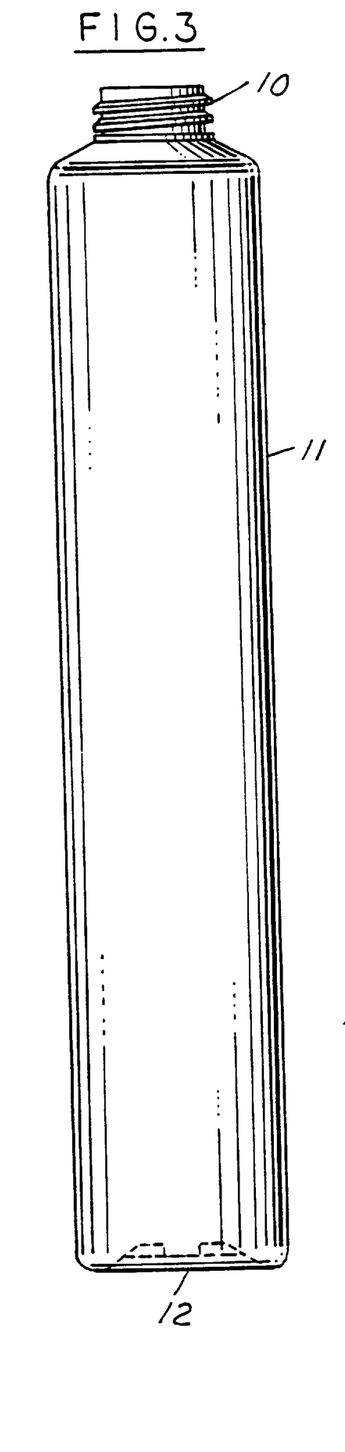
FIG. 3 is an elevational view of the container which is used to make the tube.

In accordance with the invention, the decorating steps are performed by rotating the container with respect to silk screen printer stations P, as shown in FIG. 2, by clamping the container and rotating the container relative to the station. Alternatively, decorating can be by heat bonding a label to the container or by applying a pressure sensitive label.

Referring to FIGS. 3–6, the container preferably comprises the injection molded finish 10, the extruded side wall or body 11 sufficiently thin thickness that it is flexible, and the integral bottom wall 12 which is thicker and relatively rigid to allow for driving the tube to rotate the tube in the capping and decorating operations. The wall 11 is preferably of substantially constant thickness, for example, ±0.006 in.

Figure 4:
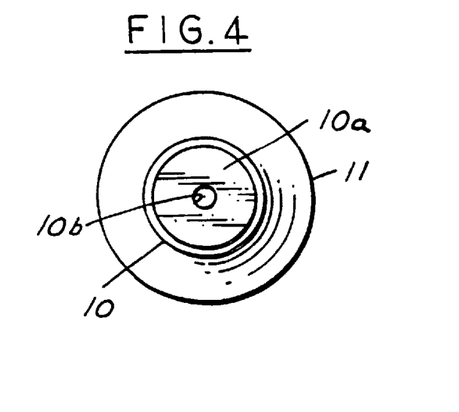
FIG. 4 is a top plan view.
Figure 5:
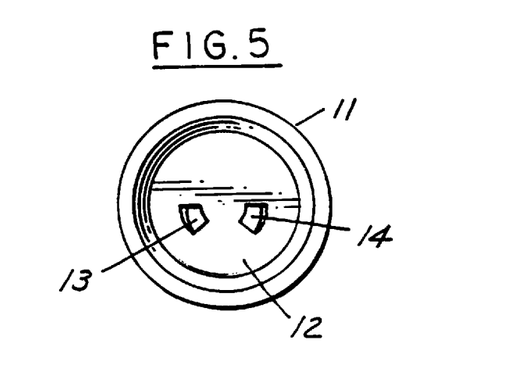
FIG. 5 is a bottom plan view.
Figure 6:
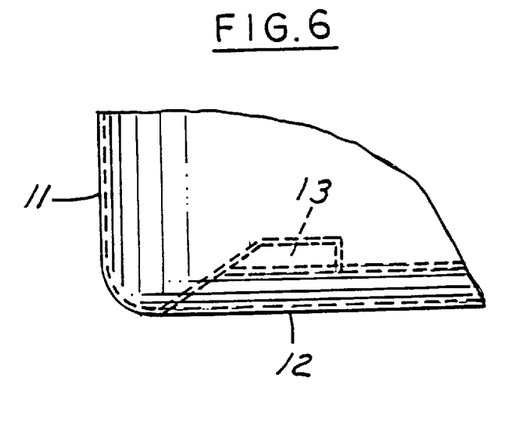
FIG. 6 is a fragmentary view of a portion of the lower end of the container.

As shown in FIGS. 5 and 6, the bottom wall 12 is formed with indentations or recesses 13, 14 which are utilized so that they can be engaged by lugs 16, 17 of a chuck 18 (FIG. 2) for the printing and application of the closure. As shown in FIG. 4, the finish 10 preferably includes a top or transverse wall 10a having a centrally located dispensing opening 10b.

The container is preferably made of linear low density polyethylene. A preferred composition is linear low density polyethylene having a dispersion index of greater than 5. However, high density polyethylene, low density polyethylene or polypropylene may be used.

Figures 7, 8:
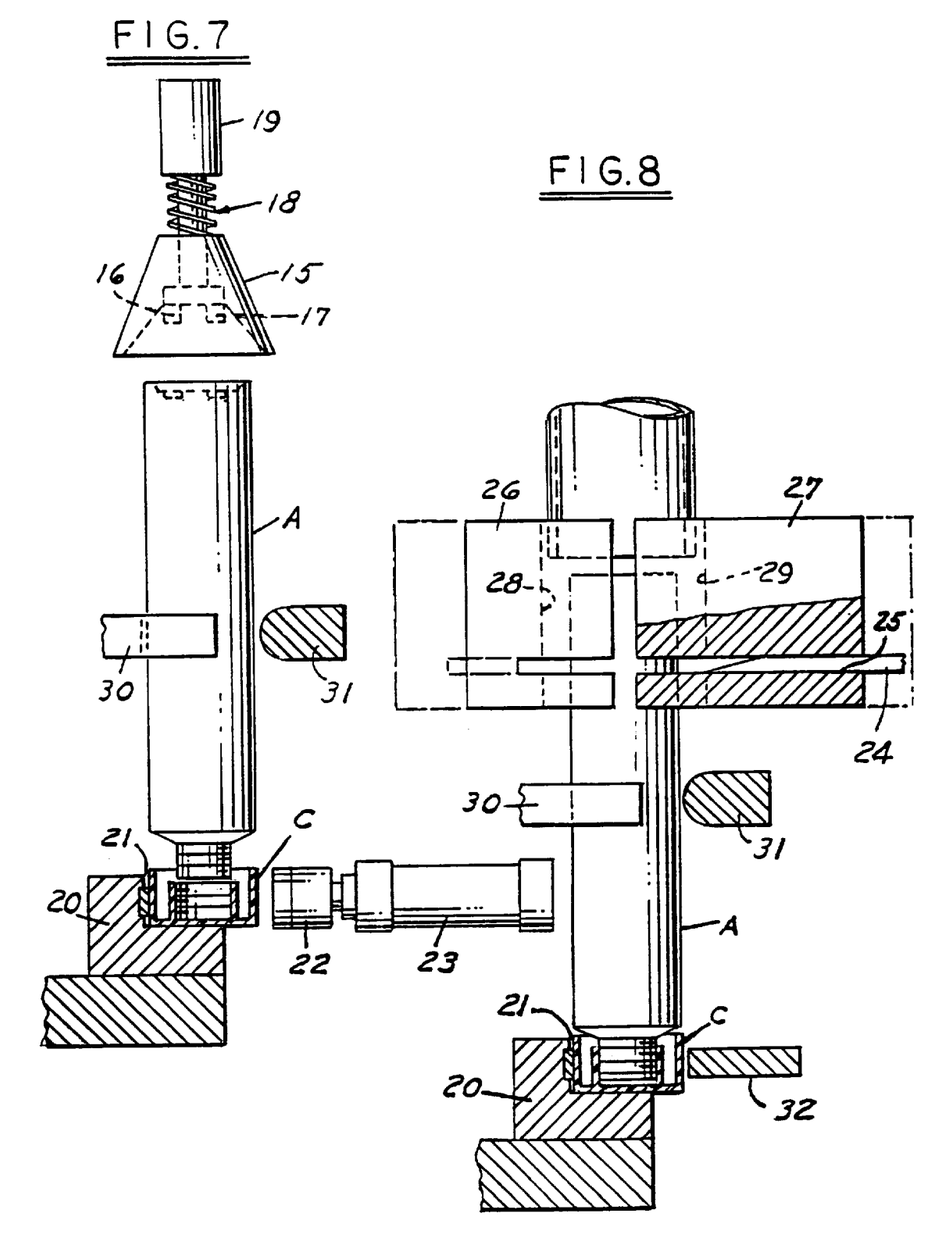
FIG. 7 is a fragmentary part sectional view of a preferred method and apparatus for applying the closure.
FIG. 8 is a fragmentary part sectional elevational view of an apparatus for severing the bottom from the container after it is decorated.

Referring to FIGS. 7 and 8, a preferred form of apparatus is shown in the aforementioned copending application Ser. No. 08/228,048 filed Apr. 15, 1994 now U.S. Pat. No. 5,632,951, incorporated herein by reference.

Referring to FIG. 8, the apparatus for severing the bottom of a container comprises a lower star wheel 20 having recesses 21 for receiving the closures C on the inverted containers A and an associated guide rail 32. The apparatus also includes an upper star wheel 30 with recesses for the container body A and an associated guide rail 31. The upper end of the container is clamped by blocks 26, 27 having recesses 28, 29 which are movable relative to one another to hold the upper end of the container A. A guillotine blade 24 is movable across the bottom of the closure by a cylinder to sever the bottom of the container A along a plane that is at 90° to the vertical or longitudinal axis of the container A. The guillotine 24 is guided by guide surfaces 25 in the blocks 26, 27.

The apparatus of FIG. 7 is preferably positioned at a capping station adjacent a rotary turret 30 which is driven intermittently past the capping station to apply the container to the closure. The apparatus shown in FIG. 8 is located at a trimming station and the turret 30 moves the inverted containers past the trimming station to sever the bottom of the container. A guide rail 32 retains the lower end of the capped container in recesses the lower star wheel during severing of the bottom of the container.

Figure 9:
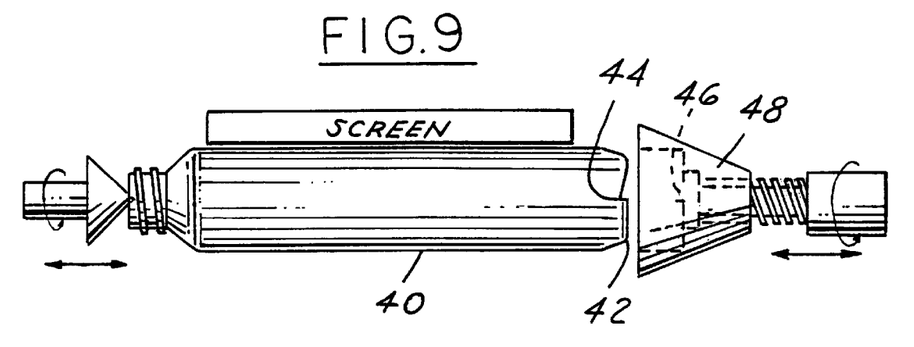
FIG. 9 is a diagram of a modified formed apparatus for silk screen decorating of a modified container.
Figures 10, 11, 12, 13, 14:
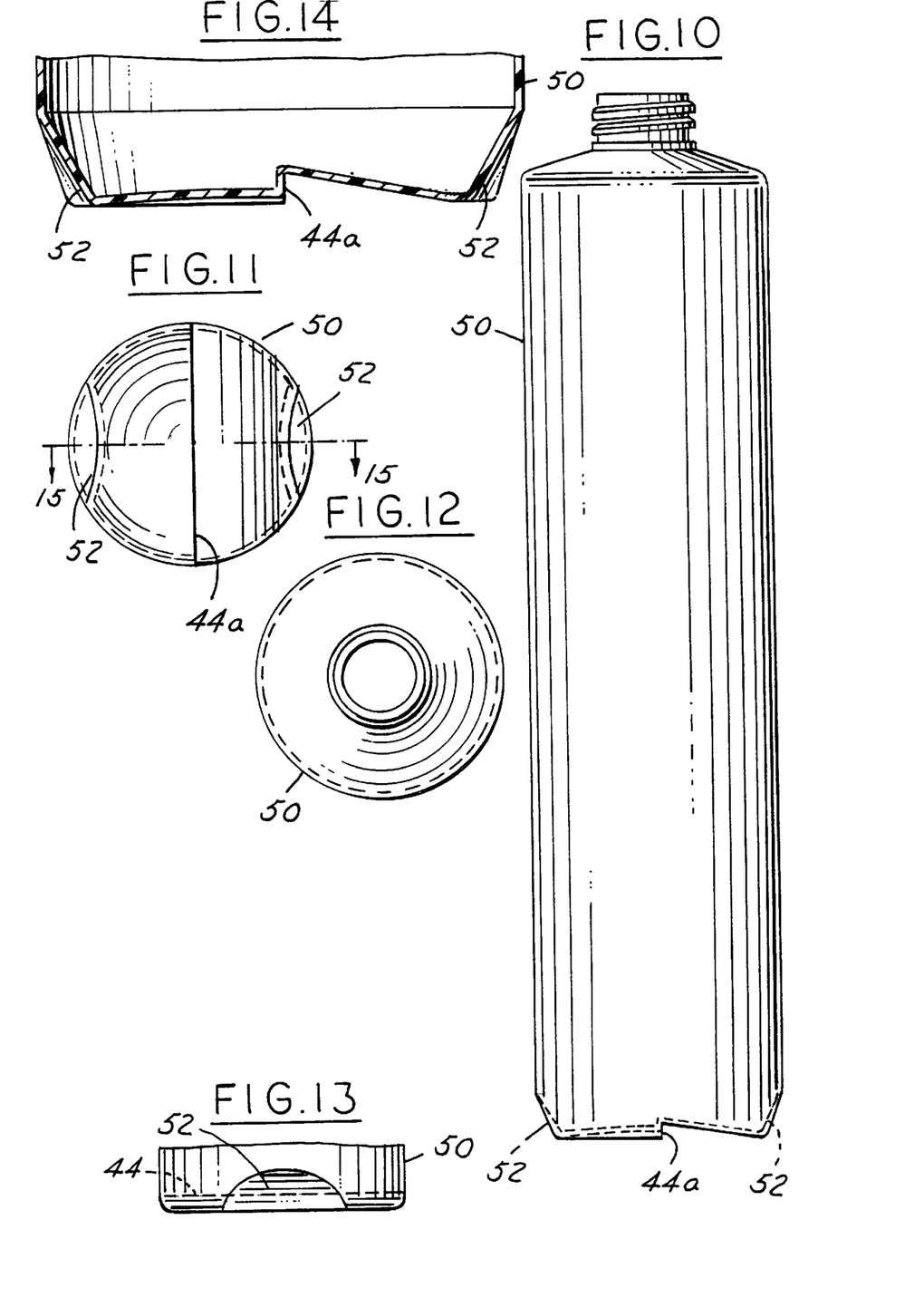
FIG. 10 is an elevational view of a modified form of container.
FIG. 11 is a bottom plan view of the container shown in FIG. 10.
FIG. 12 is a top plan view of the container shown in FIG. 10.
FIG. 13 is a fragmentary enlarged elevational view of a portion of the base of the container shown in FIG. 10 as viewed from the right or left.
FIG. 14 is a sectional view fragmentary taken along the line 14—14 in FIG. 11.
Figures 15, 16, 17, 18:
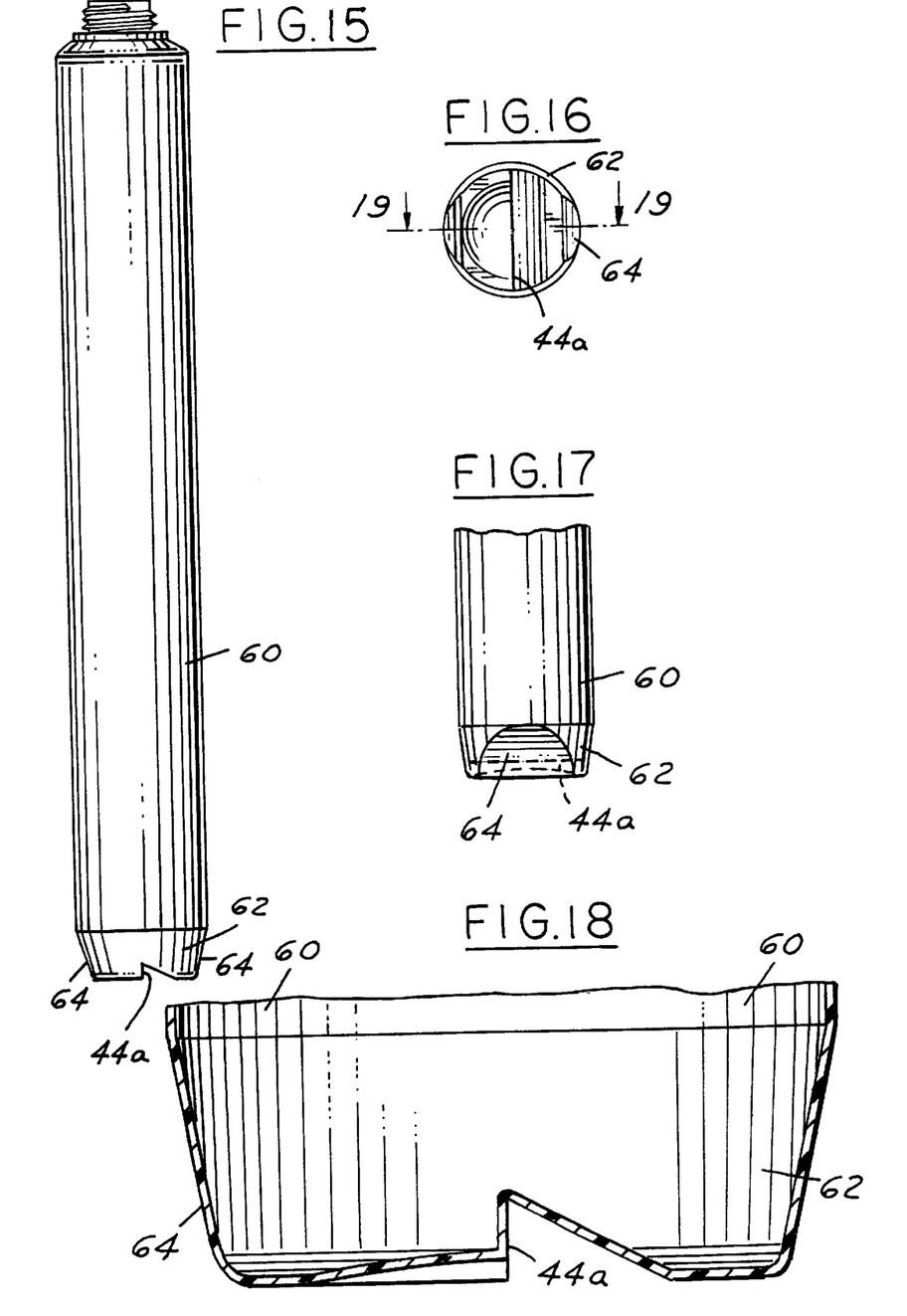
FIG. 15 is an elevational view of a modified form of container.
FIG. 16 is a bottom plan view of the container shown in FIG. 15.
FIG. 17 is a fragmentary elevational view of a portion of the base of the container shown in FIG. 15 as viewed from the right or left.
FIG. 18 is an enlarged sectional view taken along the line 18—18 in FIG. 16.

In accordance with a further aspect of the invention, a container structure is provided that facilitates handling, rotating and decorating the container before cutting the closed end. The base 42 of blow molded container 40 is formed with a single diametrical lug 44 which is engaged by the complementary lug 46 on the rotating chuck 48 (FIG. 9). Such a construction tends to rigidify the base such that the container 40 can be held and rotated more firmly for decorating. In addition, the lug construction provides a greater thickness than the side wall of the container and maximum surface for engagement by the lug 46 on chuck 48.

Referring to FIGS. 10–14, in a further form, the container 50 is formed with a diametral lug 44a. In addition, the body of the container 50 is strengthened by diametrically opposed surfaces 52 on the lower end of the container adjacent the base. Each surface 52 has an arcuate upper end and and tapers axially downwardly and inwardly toward the base 54 of the container 50. Surfaces 52 function to structurally rigidify the base while simultaneously reducing the amount of parison stretch into the base, thereby increasing the thickness of plastic in that area.

Referring to FIGS. 15–18, in another form of the container 60, the entire annular lower end 62 of the container 60 is tapered axially downwardly and inwardly to form a frustoconical surface. This functions to reduce the amount of parison stretch into the base, increasing the thickness of plastic in that area. In addition, opposed arcuate surfaces 64 are provided on the frustoconical surface.

Figure 19:
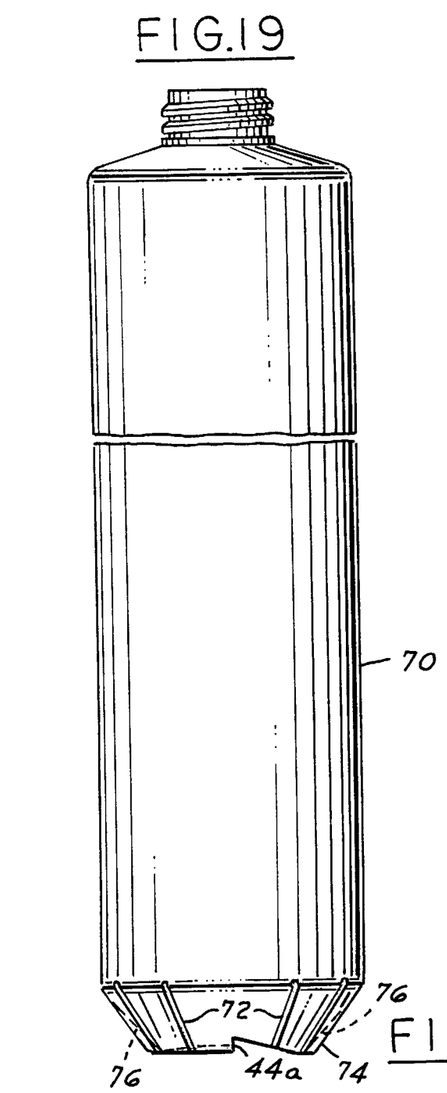
FIG. 19 is an elevational view of a modified form of container.
Figure 20:
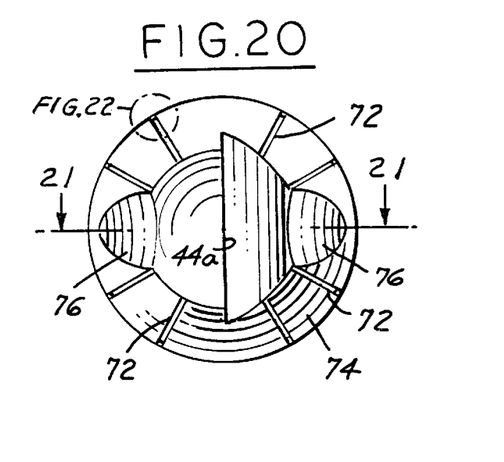
FIG. 20 is a bottom plan view of the container shown in FIG. 19.
Figure 21:
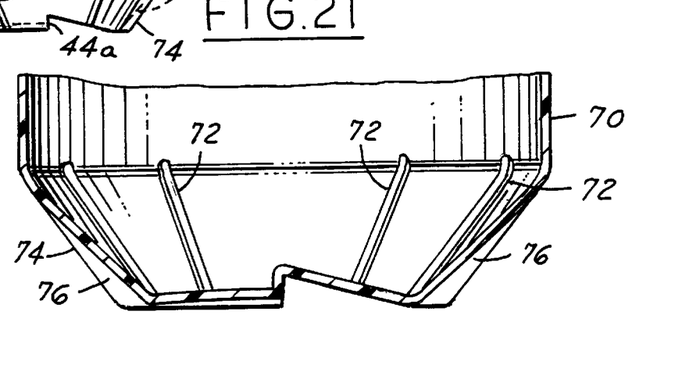
FIG. 21 is a sectional view taken along the line 21—21 in FIG. 20.
Figure 22:
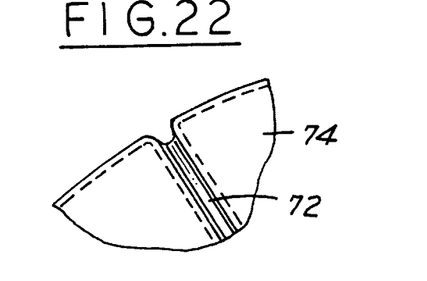
FIG. 22 is a fragmentary enlarged view on an enlarged scale of a portion of the base of the container shown in FIG. 19 taken at encircled portion 22.
Figures 23, 24, 25, 26:
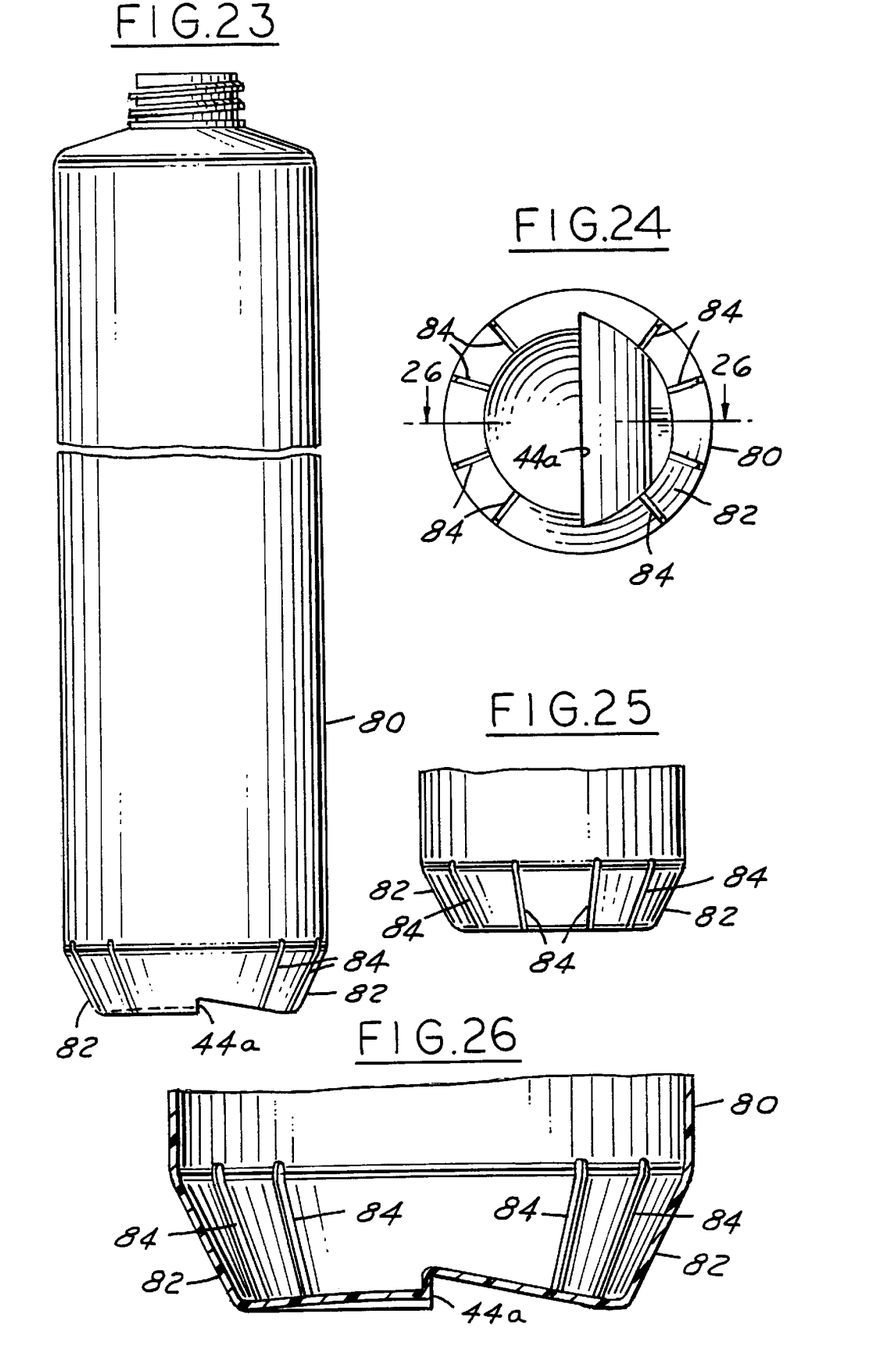
FIG. 23 is an elevational view of a modified form of container.
FIG. 24 is a bottom plan view of the container shown in FIG. 23.
FIG. 25 is a fragmentary elevational view of a portion of the base of the container shown in FIG. 10 as viewed from the right or left.
FIG. 26 is an enlarged sectional view taken along the line 26—26 in FIG. 24

Referring to FIGS. 19–21, in still further form of container 70, a plurality of circumferentially spaced grooves 72 our provided on the frustoconical surface 74. Opposed arcuate surfaces 76 are provided as in FIGS. 15–18. The grooves function to structurally rigidify the taper area of the base of the bottle.

Referring to FIGS. 23–26, in another form of container 80, the container is formed only with the frustoconical surface 82 and grooves 84.

Typical examples of containers used to make tubes in accordance with the invention comprise:

TABLE I

| | Body Wall Thickness (inches) | | |
|---|---|---|---|
| Diameter of Tube | Min | Nominal | Max |
| 2" | 0.017 | .020 | .023 |
| 1½" | 0.015 | .018 | .021 |
| 1⅜" | 0.012 | .015 | .018 |

TABLE II

| Along Lug | Thickness |
|---|---|
| 44a | |
| 44b | .018 |
| 44c | .025 |
| 44d | .030 |
| 44e | .031 |
| 44f | .024 |
| 44g | .015 |

The depth of the grooves was a radius of about 1/32".

It can thus be seen that there has been provided a method of forming a flexible plastic tube comprising injection molding a finish having an opening, extruding a tube integrally with the finish by relevant movement of the finish with respect to an extruder orifice, moving the finish axially away from the extruder orifice while continuing continuously extruding the tube, closing a blow mold about the extruded tube, blowing the tube into an integral container body having a closed bottom, opening the molds to provide an integral flexible tube with a finish thereon. Thereafter the method consists of decorating the body with indicia, and cutting the closed end of the tube leaving an open-ended tube of the end opposite the finish, and applying a closure to the finish. Preferably a closure is applied before cutting the bottom from the container. Preferably the closure is applied to the finish after decorating. Subsequently, the tube is filled through the open end and the open end is sealed. The step of decorating includes rotating the tube about the longitudinal axis of the tube while engaging the finish and bottom. The step of decorating preferably comprises rotating the container relative to a silk screen printing device. The step of injection molding and extrusion molding preferably comprises injecting and extruding linear low density polyethylene. However, high density polyethylene, low density polyethylene or polypropylene may be used.

Further, there is provided a container construction that facilitates decorating by conventional silk screening equipment wherein decorating such as silk screen and heat transfer can be done at high speeds; and wherein closures can be applied to the flexible tubes with a high torque and at higher speeds.

We claim:

1. An intermediate plastic article for use in making an open ended tube for dispensing viscous products comprising
   an injection molded finish,
   an integral shoulder portion,
   an integral flexible tubular body portion of substantially uniform thickness, and
   an integral closed bottom portion,
   said shoulder portion and bottom portion have a greater thickness than said tubular body portion,
   a diametrical lug on the base of said bottom portion for use in engaging said container and rotating said container during decoration.

2. The intermediate plastic article set forth in claim 1 including diametrically opposed surfaces on the lower end of said article adjacent said bottom portion.

3. The intermediate plastic article set forth in claim 2 wherein each said surface has an arcuate upper end and tapers axially downwardly and inwardly with respect to the tube portions toward the bottom portion.

4. The intermediate plastic article set forth in claim 2 including an annular frustoconical surface on the lower end of said tube portion adjacent said bottom portion tapering downwardly and inwardly toward the body portion.

5. The intermediate plastic article set forth in claim 4 including a plurality of circumferentially spaced grooves extending axially on said frustoconical surface.

6. An intermediate plastic article for use in making an open ended tube for dispensing viscous products comprising
   an injection molded finish,
   an integral shoulder portion,
   an integral flexible tubular body portion of substantially uniform thickness, and
   an integral closed bottom portion,
   said shoulder portion and bottom portion have a greater thickness than said tubular body portion,
   diametrically opposed surfaces on the lower end of the article adjacent said bottom portion.

7. The intermediate plastic article set forth in claim 6 wherein each said surface has an arcuate upper end and tapers axially downwardly and inwardly with respect to the tube portions toward the bottom portion.

8. The intermediate plastic article set forth in claim 6 including an annular frustoconical surface on the lower end of said tube portion adjacent said bottom portion tapering downwardly and inwardly toward the body portion.

9. The intermediate plastic article set forth in claim 8 including a plurality of circumferentially spaced grooves extending axially on said frustoconical surface.

10. An intermediate plastic article for use in making an open ended tube for dispensing viscous products comprising
    an injection molded finish,
    an integral shoulder portion,
    an integral flexible tubular body portion of substantially uniform thickness, and
    an integral closed bottom portion,
    said shoulder portion and bottom portion have a greater thickness than said tubular body portion,
    an annular frustoconical surface on the lower end of said tublar body portion adjacent said bottom portion tapering downwardly and inwardly toward the bottom portion.

11. The intermediate plastic article set forth in claim 10 including a plurality of circumferentially spaced grooves extending axially on said frustoconical surface.

* * * * *